US006706372B2

(12) United States Patent
Schulz et al.

(10) Patent No.: US 6,706,372 B2
(45) Date of Patent: Mar. 16, 2004

(54) DECORATIVE BASE PAPER WITH AN INK-JET RECEIVING LAYER

(75) Inventors: Hartmut Schulz, Wallenhorst (DE); Rainer Gumbiowski, Wallenhorst (DE)

(73) Assignee: Technocell Dekor GmbH & Co. KG (DE)

( * ) Notice: Subject to any disclaimer, the term of this patent is extended or adjusted under 35 U.S.C. 154(b) by 19 days.

(21) Appl. No.: 10/251,484

(22) Filed: Sep. 20, 2002

(65) Prior Publication Data

US 2003/0039810 A1 Feb. 27, 2003

Related U.S. Application Data

(63) Continuation of application No. 09/540,330, filed on Mar. 31, 2000, now abandoned.

(30) Foreign Application Priority Data

Apr. 13, 1999 (DE) ........................................ 199 16 546

(51) Int. Cl.[7] ................................................ B32B 27/00

(52) U.S. Cl. ....................... 428/195; 428/211; 428/207; 428/339; 428/502; 428/505; 428/506; 428/511; 428/542.2

(58) Field of Search ................................ 428/195, 211, 428/207, 339, 502, 505, 506, 511, 542.2

(56) References Cited

U.S. PATENT DOCUMENTS

| | | | | |
|---|---|---|---|---|
| 5,631,071 A | | 5/1997 | Fukunishi et al. | |
| 6,335,102 B1 | * | 1/2002 | Tsubaki et al. | 428/513 |
| 6,500,523 B1 | * | 12/2002 | Hirose et al. | 428/195 |

FOREIGN PATENT DOCUMENTS

| | | |
|---|---|---|
| EP | 0054405 | 6/1982 |
| FR | 2734203 | 11/1996 |

OTHER PUBLICATIONS

Japanese Abstract (Mitsubishi), Publication No. 10264596, dated Oct. 6, 1998.

Japanese Abstract (Kimoto), Publication No. 10309764, dated Nov. 24, 1998.

* cited by examiner

*Primary Examiner*—Deborah Jones
*Assistant Examiner*—Ling Xu
(74) *Attorney, Agent, or Firm*—Cook, Alex, McFarron, Manzo, Cummings & Mehler, Ltd.

(57) ABSTRACT

A decorative base paper or a preimpregnated decorative base paper is finished with an ink absorbing layer for printing by the ink-jet method.

12 Claims, No Drawings

DECORATIVE BASE PAPER WITH AN INK-JET RECEIVING LAYER

RELATED APPLICATION

This application is a continuation of application Ser. No. 09/540,330, filed Mar. 31, 2000, abn.

BACKGROUND, SUMMARY AND DESCRIPTION OF THE INVENTION

This invention concerns a decorative base paper that can be printed by ink-jet printing methods or a preimpregnated decorative base paper for decorative coating materials, in particular a film base paper and a printing base paper.

Decorative base paper is needed for the production of decorative laminates, decorative films and preimpregnates. Decorative coating materials are used for surface coating in furniture manufacture and in interior finishing.

Decorative base paper is needed in various basis weights for a variety of applications. Edging decorative base paper has an average basis weight of 200 g/m$^2$. The basis weight of decorative base paper for surface finishing, however, is in the range of 20 to 200 g/m$^2$. Overlay paper with a basis weight of 15 to 40 g/m$^2$ is also needed. It is used as a covering material in combination laminates of overlay paper, decorative paper, barrier paper and fiberboard.

Traditional film base papers or preimpregnates are printed with the desired pattern, impregnated with an acrylate-urea polymer and then glued to a substrate. The printing pattern is applied by a gravure printing method. This results in high ink consumption, and the image definition is often inadequate due to missing dots. It is very complicated and expensive to produce small quantities of printed material.

With a preimpregnate, the decorative base paper is impregnated at the time of production in the paper machine. After printing, the printed surface is coated and the back of the preimpregnate is glued to a substrate. The preimpregnate has a basis weight of 20 to 100 g/m$^2$.

DE 195 03 745 C1 describes a specific form of a film base paper which is preferably used for coating game boards.

The ink-jet printing method has been known since the beginning of the '80s. Although photo-quality prints have been possible with this technology since the end of the '80s, the above-mentioned gravure printing method has still to be used for printing decorative base paper.

The object of this invention is to finish a decorative base paper so that it can be printed by the ink-jet printing method with good printing properties as well as low ink consumption, good image definition and a high color density.

This object is achieved by using coating materials based on a decorative base paper on which an ink receiving layer has been created. Such coating materials based on decorative base paper are, in particular, film base papers or printing base papers. Film base papers according to this invention are thus preimpregnated decorative base papers with an ink receiving layer. Printing base papers according to this invention are unimpregnated decorative base paper with an ink receiving layer.

Decorative base papers differ fundamentally in their properties from normal ink-jet papers which are used to produce color prints, graphics and photo-quality printouts. These papers have a closed surface which is produced by a synthetic resin coating or a casting coating. After applying the ink receiving layer, there is a clear separation between the carrier and the coating.

Decorative base paper, on the other hand, has an open surface so that the decorative base paper can be impregnated rapidly and uniformly with the impregnating resin. Traditional decorative base paper is therefore unsuitable for coating with an ink receiving layer because it is impossible to form a uniformly thick ink receiving layer on the surface of decorative base paper.

According to one embodiment of this invention, the decorative base paper is a decorative base paper which is smooth on one side, is preimpregnated before printing and is coated with an ink receiving layer on the smooth side. The decorative base paper with one smooth side is preferably produced on a yankee paper machine where the wire side of the paper web is smoothed with the help of a heated cylinder. Due to the prolonged contact time of the paper with the cylinder, it is possible to produce a smooth surface that is resistant to moisture. Preimpregnation is performed in the paper machine, with the quantity of the impregnating agent being 5 to 30% by weight, based on the paper pulp.

The decorative base paper used according to another embodiment of this invention is decorative base paper that is smoothed in a soft calender. The ink receiving layer is applied to a smoothed side.

Suitable impregnating agents include the impregnating resins conventionally used in this technical field, in particular melamine-formaldehyde resin, urea-formaldehyde resin, phenol-formaldehyde resin, uric acid-acrylate ester copolymers or polyvinyl alcohol.

To achieve adequate resin uptake and at the same time prevent the ink receiving layer from sinking into the paper, the air permeability of the decorative base paper which is smooth on one side must amount to 3 to 20 seconds according to Gurley. The smoothness according to Bekk must be no higher than 50 Bekk seconds. The air permeability of a decorative base paper smoothed with a soft calender amounts to 20 to 40 Gurley seconds, in particular 30 to 40 Gurley seconds. The smoothness of this base paper amounts to at least 50 Bekk seconds.

The basis weight of the decorative base paper according to this invention is in the range of 15 to 400 g/m$^2$, and amounts to 15 to 40 g/m$^2$ or 20 to 200 g/m$^2$, for example. The basis weights are selected as a function of the specific application.

To produce these different decorative base papers, softwood pulp (long-staple pulp) or hardwood cellulose (short-staple pulp) may be used. A mixture of softwood and hardwood pulps in a ratio of 10:90 to 90:10 is preferred. A mixture of softwood and hardwood pulps in a ratio of 30:70 to 70:30 is especially preferred. The wood pulp may have a degree of beating of 20° to 60° SR according to Schopper-Riegler. To achieve a high opacity, a pigment such as titanium dioxide or calcium carbonate may be added. The amount of the pigment, based on the weight of the wood pulp, may be 10 to 40% by weight.

In addition, wet strength agents such as polyamide/polyamine-epichlorohydrin resin, cationic polyacrylates, modified melamine-formaldehyde resin or cationic starches may be added to the wood pulp suspension used to produce the decorative base paper. Likewise, it is also possible to add retention aids and coloring agents.

The sheets can be formed on a yankee paper machine or a Foudrinier paper machine.

All the known receiving layers can be used for the ink receiving layer. These are usually hydrophilic coatings which contain water-soluble or water-dispersible polymers such as polyvinyl alcohol, cationic polyvinyl alcohol, polyvinyl pyrrolidone, polyvinyl acetate, starch, gelatin, casein or carboxymethylcellulose. The ink receiving layer may also contain pigments and cationic substances for fixation of the ink pigments. Ink receiving layers suitable for use according to this invention are described in German Patents 43 22 179 and 43 22 178 and in German Patent Applications 196 04 693 and 196 18 607 the disclosure of which is incorporated by reference. Ink receiving layers that contain pigment are preferred.

The application weight of the ink receiving layer is 2 to 20 g/m$^2$, in particular 5 to 15 g/m$^2$. The ink receiving layer can be applied with the usual application methods such as roller application, gravure application or nipp methods and airbrush or roll doctor metering.

This invention is explained in greater detail on the basis of the following examples.

EXAMPLE 1

A mixture of 90% by weight hardwood sulfate pulp and 10% by weight softwood sulfate pulp was pulped at a consistency of 4% to a degree of beating of 42° SR. Then 5% by weight melamine-formaldehyde resin and 15% by weight titanium dioxide (rutile form) was added (weight amounts of additives are based on the wood pulp). An edging decorative base paper with a basis weight of 200 g/m$^2$ and a thickness of 300 $\mu$m was prepared from this mixture. The paper had a smoothness of 33 Bekk seconds and an air permeability of 7 Gurley seconds.

The resulting base paper was coated with an ink receiving layer and was printed by an ink-jet method.

EXAMPLE 2

A mixture of 70% by weight hardwood sulfate pulp and 30% by weight softwood sulfate pulp was pulped at a consistency of 4% to a degree of beating of 42° SR. Then 5% by weight polyamide/polyamine-epichlorohydrin resin and 25% by weight titanium dioxide (rutile form) were added (weight amounts of additives based on wood pulp).

A decorative base paper was produced from this mixture with a basis weight of 100 g/m$^2$ and a thickness of 120 $\mu$m. The paper had a smoothness of 35 Bekk seconds and an air permeability of 8 Gurley seconds.

The resulting decorative base paper was provided with an ink receiving layer and printed by the ink-jet printing method.

EXAMPLE 3

A mixture of 20% by weight hardwood sulfate pulp and 80% by weight softwood sulfate pulp was pulped at a consistency of 4% to a degree of beating of 45° SR. Then 4% by weight polyamide/polyamine-epichlorohydrin resin, 15% by weight $Al_2O_3$ and 0.2% by weight of a sodium salt of a polycarboxylic acid were added as retention aids (weight amounts of additives are based on the wood pulp). An overlay paper with a basis weight of 28 g/m$^2$ and a thickness of 32 $\mu$m was produced from this mixture. The paper had an air permeability of <5 Gurley seconds (5-sheet stack measurement).

The resulting decorative base paper was provided with an ink receiving layer and then was printed by the ink-jet printing method.

EXAMPLE 4

A mixture of 50% by weight hardwood sulfate pulp and 50% by weight softwood sulfate pulp was pulped at a consistency of 4% to a degree of beating of 42° SR. Then 5% by weight polyamide/polyamine-epichlorohydrin resin and 20% by weight titanium dioxide (rutile form) were added (weight amounts of additives are based on the pulp). Then with the help of a yankee paper machine, a decorative base paper that was smooth on one side with a smoothness of 30 Bekk seconds and an air permeability of 7 Gurley seconds was produced using this mixture. Next a preimpregnate with a basis weight of 80 g/m$^2$ and a thickness of 80 $\mu$m was produced from this by impregnation with a urea-acrylate. The application weight of the impregnating agent was 20 g/m$^2$.

The resulting preimpregnate was provided with an ink receiving layer and was printed by the ink-jet method.

EXAMPLE 5

A mixture of 50% by weight hardwood sulfate pulp and 50% by weight softwood sulfate pulp was pulped at a consistency of 4% to a degree of beating of 50° SR. To the pulp suspension were added 30% by weight $CaCO_3$, 0.60% by weight cationic starch, 0.10% by weight cationic polyacrylamide, 0.25% by weight polyamide/polyamine-epichlorohydrin resin and 0.30% by weight alkylketene dimer (quantity amounts based on the pulp); then a decorative base paper with a weight of 100 g/m$^2$ was produced from this pulp and then was coated with oxidized starch with an application weight of 1 g/m$^2$ (so-called film base paper). The uncoated base paper had a smoothness of 30 Bekk seconds and an air permeability of 10 Gurley seconds.

The resulting film base paper was provided with an ink receiving layer and printed by the ink-jet printing method.

Comparative Example V1

A commercial decorative base paper from Technocell® Dekor GmbH having a basis weight of 150 g/m$^2$ and a thickness of 190 $\mu$m was used as Comparative Example V1. The paper had a smoothness of 67 Bekk seconds and an air permeability of 22 Gurley seconds. The paper was printed by the traditional gravure printing method.

The ink receiving layer used in these examples had the following composition:

| | |
|---|---|
| polyvinyl alcohol, 20% aqueous solution | 33 parts by weight |
| polyacrylamide, 20% aqueous solution | 9 parts by weight |
| acrylic acid ester polymer, 20% dispersion | 10 parts by weight |
| amorphous silica, 20% dispersion | 48 parts by weight |

The paper was coated by doctor dosage. The application weights are given in Table 1 and are based on the dried layer.

TABLE 1

| | Application weight g/m$^2$ |
|---|---|
| Example 1 | 10 |
| Example 2 | 14 |
| Example 3 | 5 |
| Example 4 | 6 |
| Example 5 | 6 |

The paper according to this invention was printed in color with a Hewlett Packard (HP) Deskjet® 550C ink-jet printer. The color density and the image definition of the printed paper were tested. The results are shown in Table 2.

Determination of color density—The color density was determined with a Gretag densitometer on the colors cyan, magenta, yellow and black in direct light.

Determination of image definition—The image definition was determined by image processing. The pattern was entered using a CCD camera and the lack of definition at the color edges was compared with an ideal straight line. The deviation is given as a numerical value from 0.00 to 1.00 (very good to very bad).

TABLE 2

| | Cyan | Magenta | Yellow | Black | Definition |
|---|---|---|---|---|---|
| B1 | 1.88 | 1.12 | 1.29 | 1.77 | 0.25 |
| B2 | 1.85 | 1.10 | 1.25 | 1.75 | 0.28 |
| B3 | 1.80 | 1.01 | 1.20 | 1.69 | 0.31 |
| B4 | 1.78 | 1.02 | 1.19 | 1.67 | 0.32 |
| B5 | 1.81 | 1.04 | 1.24 | 1.69 | 0.29 |
| V1 | 1.31 | 0.75 | 1.00 | 1.54 | 0.75 |

The results of these tests show that printings with a very good image definition and high color density can be achieved with the decorative paper according to this invention. Contrary to assumptions, no adhesion problems occurred in the next processing step, namely overpainting the printed decorative paper. The drying time of the ink in printing a preimpregnate was not impaired either.

What we claim is:

1. A decorative base paper for decorative coating materials, said paper comprising a preimgregnated decorative base paper, and an ink-jet receiving layer on said preimpregnated decorative base paper.

2. A decorative base paper according to claim 1, wherein the base paper is preimpregnated with melamine-formaldehyde resin, a urea acid-formaldehyde resin or a phenol-formaldehyde resin, a uric acid-acrylate ester copolymer or polyvinyl alcohol.

3. A decorative base paper according to claim 2, wherein the quantity of the preimpregnation agent is 5–30% by weight based on the amount of paper pulp in the decorative base paper.

4. A decorative base paper according to claim 1, wherein the decorative base paper is smooth on one side.

5. A decorative base paper according to claim 1, wherein the decorative base paper is smoothed in a soft calender.

6. A decorative base paper according to claim 1, wherein the air permeability of the decorative base paper is 3 to 40 Gurley seconds.

7. A decorative base paper according to claim 6, wherein the air permeability of the decorative base paper is 3 to 20 Gurley seconds.

8. A decorative base paper according to claim 7, wherein the smoothness of the decorative base paper does not exceed 50 Bekk seconds.

9. A decorative base paper according to claim 6, wherein the air permeability of the decorative base paper is 30 to 40 Gurley seconds.

10. A decorative base paper according to claim 9, wherein the smoothness of the decorative base paper amounts to at least 50 Bekk seconds.

11. A decorative base paper according to claim 1, wherein the ink-jet receiving layer contains a pigment.

12. A decorative base paper according to claim 1, wherein the quantity of the preimpregnation agent is 5–30% by weight based on the amount of paper pulp in the decorative base paper.

* * * * *